Nov. 12, 1968    J. L. DAGHE ET AL    3,410,522
CORPORATION STOP
Filed Oct. 21, 1965    2 Sheets-Sheet 1
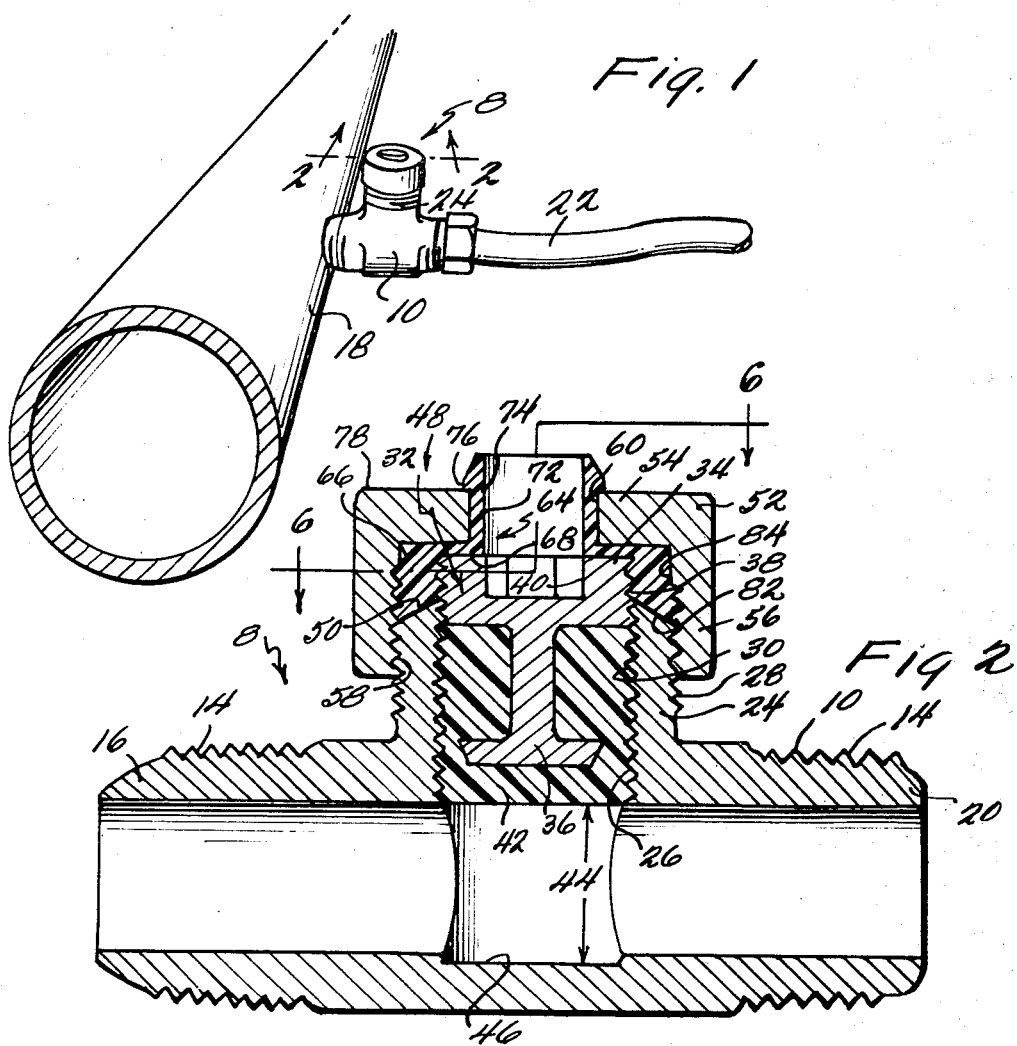
INVENTORS
JOSEPH L. DAGHE
BEN G. FINLEY
AMOS D. PARKS
WILBUR R. LEOPOLD, JR.
BY Cushman, Darby & Cushman
ATTORNEYS Nov. 12, 1968    J. L. DAGHE ET AL    3,410,522
CORPORATION STOP Filed Oct. 21, 1965    2 Sheets-Sheet 2

INVENTORS
JOSEPH L. DAGHE
BEN G. FINLEY
AMOS D. PARKS
WILBUR R. LEOPOLD, JR.
BY
Cushman, Darby & Cushman
ATTORNEYS United States Patent Office 3,410,522
Patented Nov. 12, 1968

3,410,522
CORPORATION STOP
Joseph L. Daghe, Ben G. Finley, Amos D. Parks, and Wilbur R. Leopold, Jr., Decatur, Ill., assignors to Mueller Co., Decatur, Ill., a corporation of Illinois
Filed Oct. 21, 1965, Ser. No. 499,487
13 Claims. (Cl. 251—218)

ABSTRACT OF THE DISCLOSURE

A corporation stop for use in a tapping and installation machine with means which allow such machines to accommodate stops of greater through-bore diameter. Accordingly, a washer element is arranged to form an axial extension of the boss within which the through-bore stopper is received. The boss, therefore, will be shorter than the stopper and hence will require a shorter turning radius. Present machines designed for a particular through-bore diameter can thus accommodate greater through-bore diameter stops since the turning boss does not have to be extended in axial length.

---

This invention relates to a valve for controlling the flow of fluid under high pressure through a line. Although the invention is particularly adapted to valves known in the industry as corporation stops and is described herein in connection therewith, it will be realized that the invention is applicable to valves adapted to other uses.

Corporation stops are used in industrial and residential piping particularly at connections between a street main and a service line. Corporation stops are used to stop the flow of high pressure fluid, such as gas or water, in order to permit repairs, further installations, or the like in the line from which the fluid has been cut off. It is basically an object of this invention to provide an improved valve which is not only cheaper to manufacture but also effective as a stopper means for fluids under high pressures. The stopper itself comprises an expansible, resilient member which expands radially to block the flow of fluid through the line when it is moved into a position blocking the line. The resilient member is molded on a projecting key of a metal plug which provides a stiffening support for the resilient member.

The body member in which the stopper is incorporated has a through-bore forming a continuation of the fluid line. The body member has a lateral boss thereon having a bore communicating with the through-bore. The plug and resilient stopper molded thereto are disposed within the boss for reciprocal movement into and out of the through-bore of the body member. The boss or its equivalent is of sufficient axial length to enable the stopper to be completely removed from the through-bore of the body member so as to allow an unrestricted flow of fluid passing therethrough. It is within the scope of the invention to make the diameter of the stopper slightly larger than the bore through the boss so that the stopper will have an interference fit within the boss and provide a leakproof valve construction.

While it is an object of this invention to employ a valve which in its released or open position provides an unrestricted flow, it is also an object of this invention to provide a means for accommodating corporation stops of greater through-bore diameter than those presently used in tapping and installation machines of a particular size. Because high pressure mains desirably are tapped without shutting off the fluid flowing therethrough, it is necessary to provide a corporation stop which can be manipulated within the barrel of a tapping and installation machine so that it can be threaded into the tapped hole formed by the tapping tool. Inasmuch as the corporation stop usually is threaded into the main, it will be seen that the corporation stop has a turning radius defined by the distance from the intersection of the axes of the through-bore and the boss bore to the rim of the boss.

It is an object of this invention, therefore, to reduce the axial length of the boss so that the radius of the through-bore of a particular stop can be increased for any given tapping machine having a barrel of a given minimum radius establishing a certain maximum limit on the stop turning radius.

While it is simple enough to reduce the axial length of the corporation stop and increase the radius of the through-bore, it should be remembered that preferably the boss or its equivalent must have sufficient axial length so that the stopper and plug can be screwed out of a position of obstruction within the through-bore. Therefore, it is an object of this invention to provide a detachable means for extending the effective axial length of the boss bore, which means enables the turning radius of the stop of given through-bore radius to be reduced. Broadly, this means comprises a cap having a washer inserted therethrough which includes a skirt portion serving as an axial extension of the boss.

It is a further object of this invention to provide means for interengaging the cap and the washer so that these parts can be transported and used as an assembled unit.

It is a further object of this invention to use the washer as a sealing means for the corporation stop.

It is another object of this invention to provide means which enables the cap, which is threadably engaged to the boss, to be tightened by the frictional engagement therewith of the plug and resilient stoppers when the latter are screwed outwardly in the boss. Such a means protects against the cap being screwed off the boss as the stopper is screwed out of its blocking engagement with the through-bore of the body member. Thus the cap serves as an effective stop against removal of the valve mechanism.

It is also an object of this invention to provide a means by which the valve mechanism including the plug and resilient stopper can be operated without removing the cap. One such means, as disclosed in this application, includes an aperture through the cap and washer through which a turning-tool can be inserted to engage a socket within the end of the plug by which the plug can be rotated to effect reciprocation thereof.

These and other objects of this invention are more clearly depicted in the following detailed description having specific reference to the attached drawings in which the embodiments of the invention are shown, not to limit the scope of the invention in any respect but so that the principles thereof might be more clearly demonstrated.

In the drawings:

FIGURE 1 is a perspective view of the corporation stop assembled between a main and service line;

FIGURE 2 is a longitudinal sectional view of the corporation stop taken substantially along the lines 2—2 of FIGURE 1;

FIGURE 6 is a fragmentary plan view of the corporation stop with parts broken away substantially along the lines 6—6 of FIGURE 2 to disclose details otherwise hidden from view.

Figure 4:
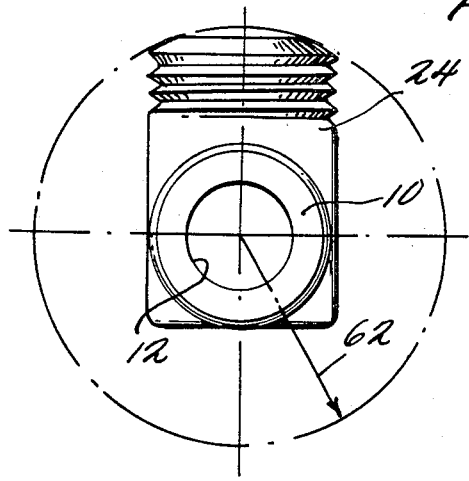
FIGURE 4 is an end view of the corporation stop diagrammatically illustrating its turning radius.

Referring now to the drawings, there is shown in FIGURES 1 to 6 a corporation stop 8 embodying this invention. The stop 8 includes a body member 10, preferably made of brass, having a through-bore 12 and being exteriorly threaded 14 on the opposite ends thereof. As seen in FIGURE 2, the inlet end 16 is slightly tapered and is adapted to be screwed into a tapped hole formed in a main 18, shown in FIGURE 1. The outlet end 20 is shown as being provided with exterior threads 14 for attachment to a service line 22 or the like, but it will be realized that other means for such attachment may be utilized. Intermediate its two ends the body member 10 has a transversely extending boss or lateral projection 24 integrally formed therewith. The boss has a bore 26 extending axially therethrough communicating with the through-bore 12 of the body member 10. The boss is threaded exteriorly, as at 28, and interiorly, as at 30, with one of the threads being left-handed and the other thread being right-handed for a purpose which will become apparent. The boss houses a valve member 32 and consequently should have an axial length sufficient to enable the valve member to clear the through-bore 12 so as to allow an unrestricted flow of fluid therethrough. At its inner end the base of the boss is extended inwardly to provide a smooth-walled inwardly tapered bore section 44 that intersects the through-bore 12 of the valve body. The tapered bore section is of greater minimum diameter, i.e., at its inner end, than the diameter of the valve member through-bore, as seen in FIGURES 2 and 4.

The valve member itself includes a plug 34 of rigid material, such as brass or plastic material (e.g., Delrin), having on its inner end an integral key 36 of smaller cross-sectional dimension than the plug. The plug 34 has exterior threads 38 which are adapted to engage the interior threads 30 of the boss. It is preferable to include a non-circular tool-engageable socket 40 in the outer end of the plug which enables the plug to be rotated. It will be seen that the combination of the threaded engagement of the plug 34 within the bore 26 and the rotation thereof causes the plug to move axially within the boss.

Figure 3:
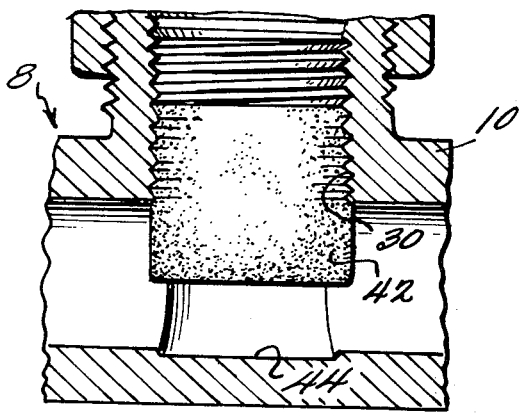
FIGURE 3 is a fragmental section view taken substantially along the same lines as FIGURE 2 showing a modification of the resilient stopper.

A resilient stopper 42 of rubber or the like, is molded onto the key 36 of the plug for movement therewith. The length of the stopper preferably is slightly greater than the diameter of the through-bore and of the length of the extended bore section 44 of the boss, for reasons later apparent. When the plug is screwed into its innermost position, the resilient stopper 42 is forced into the tapered bore section 44 which intersects the through-bore 12 and continued axial pressure on the resilient stopper 42 once it engages the wall 46 of the tapered bore section, causes it to expand radially and block the through-bore thereby providing a fluid-tight seal. The stopper has a diameter the same as or slightly smaller than the diameter of the crest of the threads 30 in the boss. However, it will be appreciated, as shown in FIGURE 3, that the stopper 42 could be of slightly larger diameter so that an interference fit would be effected with the threads 30.

A cap unit 48 is provided to seal the outer end or rim 50 of the boss 24 and to provide an abutment means for stopping the plug once it has been screwed sufficiently outwardly to enable the stopper to clear the through-bore. The cap unit comprises a cap 52 having a top portion 54 and an annular skirt 56 formed integrally therewith. The cap has interior threads 58 formed on the depending skirt 56 which are adapted to engage the exterior threads 28 of the boss. Preferably, the cap has an aperture 60 through its top portion 54 coaxially aligned with the bore 26 of the boss and with the socket 40 in the plug so that a turning-tool can be inserted through the aperture 60 to engage the socket 40 and rotate the plug 34 without removing the cap. Such an operation, i.e., leaving the cap in place while rotating the plug, also has the advantage of allowing the cap to act as a stop for the plug when the latter has been sufficiently screwed outwardly to completely unblock the through-bore. As heretofore explained, the turning radius of the stop, designated in FIGURE 4 at 62, comprises the distance from the intersection of the axes of the through-bore 12 and the boss bore 26 to the rim 50 of the boss. The boss, however, must have an effective length sufficient to enable the plug and stopper to be removed from the through-bore. Naturally, given a tapping and stop-installing machine capable of installing a corporation stop having a specific maximum turning radius, the length of the boss will, in general, determine the radius of the through-bore. A decrease in the length of the boss will increase the maximum possible radius of the through-bore for any tapping machine having a barrel of given minimum radius which will also increase the size of the stopper member needed to close off the through-bore. It will be appreciated that the cycle is completed by recognizing the fact that a larger stopper requires a boss of greater axial length.

Therefore, it is an object of this invention to provide a means for effectively lengthening the boss without increasing the turning radius of the corporation stop. To accomplish this object, a cap-like washer 64 having a skirt 66 is inserted between the cap 52 and the outer end 50 of the boss. The skirt 66 essentially constitutes an extension of the boss, while the top portion 68 of the washer overlies the bore of the boss. In order for the cap and washer to be handled, stored, and shipped as a unitary assembly, the washer 64, which preferably is made of polyethylene or material of similar characteristics, is provided with a central aperture 70, as seen more clearly in FIGURE 5, for insertion of the aforementioned turning-tool therethrough surrounded by an outwardly-extending sleeve portion 72 snugly engageable within the aperture 60 of the cap 52. The outer end 74 of the sleeve portion is provided with an exterior bead 76 or similar enlargement which overlies the outerside 78 of the cap in order to retain the washer in the cap. It will be seen that this construction essentially affords a snap-fit of the washer in the cap.

The length of the boss preferably is such that when the valve member is unscrewed or retracted sufficiently for the through-bore to be completely unblocked, a few threads are still engaged between the valve member and the boss as shown in FIGURE 2. Consequently, when the valve member 32 is thus fully retracted, it engages against the top portion 68 of the washer to form a tight seal therewith, while the skirt 66 of the washer is clamped tightly, by the cap, against the outer end 50 of the boss to form a tight seal.

Figure 5:
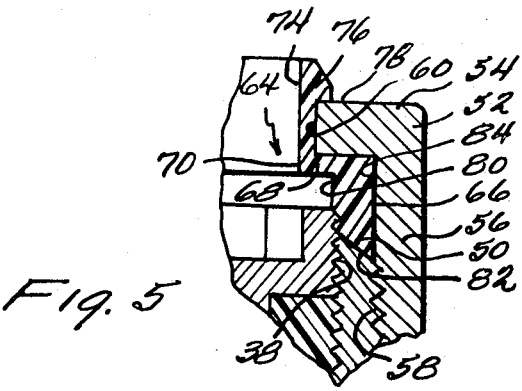
FIGURE 5 is an enlarged fragmentary sectional view of a portion of the boss, valve member, and cap unit taken substantially along the same lines as FIGURE 2.

Inasmuch as the valve member is in its closed position when the corporation stop is installed and the cap and washer are subsequently assembled thereto, it further is desirable to make the skirt of the washer with a smooth-walled inner surface 80 of a diameter slightly smaller than the crest diameter of the threads on the valve member, as shown in FIGURE 5. Thus, after the cap and washer have been installed, when the valve member is unscrewed and retracted to its fully opened position, the exterior threads 38 on the valve member cut corresponding threads in the inner surface 80 of the skirt of the washer to provide a further tight seal against leakage.

It further will be seen that the rim 50 of the boss is exteriorly bevelled, which construction, as will be seen from FIGURE 4, decreases the effective turning radius of the stop. Desirably, the rim 82 of the skirt on the washer is complementary to the outer end of the boss for a tight seal therewith.

When the plug is screwed outwardly and cuts threads into the washer, it is obvious that the washer must be held stationary. Accordingly, means are provided for interengaging the cap and the washer for preventing relative rotation therebetween. As illustrated in FIGURE 6 this interengaging means between the washer and the cap comprises forming the skirt of the cap with an inner portion 84 inwardly of the threads 58 of a non-circular (e.g., octagonal), configuration, and making the corresponding periphery 84 of the skirt 66 of the washer complementary thereto.

It now becomes apparent why it is desirable to have threads of opposite hand on the interior and exterior of the boss. By having threads of opposite hand on the exterior of the boss, the rotational frictional engagement between the cap and the valve plug, as the latter reaches its fully open position, causes the cap to screw itself tighter on the boss.

While a preferred form of the invention has been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and scope of the claims appended hereto.

What is claimed is:

1. A valve for controlling the flow of fluid under pressure through a line comprising:
    a generally-tubular body member having a through-bore and a transversely-extending integral boss intermediate the ends of the member, the boss being provided with exterior and interior threads and with a bore communicating with the through-bore;
    a cap having interior threads engaging the exterior threads of the boss, the cap having an aperture therethrough coaxially aligned with the bore of the boss;
    a washer between the boss and the cap and having an aperture coaxial with the aperture of the cap, the inner side of the washer having a projecting peripheral skirt, the end of the skirt engaging the rim of the boss and constituting an extension of the latter;
    a valve plug having exterior threads engaging the interior threads of the boss and a non-circular rotating-tool-engageable means on the outer end of the plug accessible through the aperture in the cap;
    a resilient stopper secured to the inner end of the plug and movable by rotation of the latter from a valve-closed position blocking the through-bore to a valve-open position substantially within the boss bore; and
    the washer being plastic and the inner surface of the skirt being initially smooth and defining a bore having a diameter slightly smaller than the crest diameter of the threads on the valve plug, and the skirt being adapted to have threads cut therein when the plug is moved from valve-closed to valve-open position to effect a seal between the plug and the washer.

2. A valve for controlling the flow of fluid under pressure through a line and used in tapping and installation machines comprising:
    a generally-tubular body member having a through-bore and a transversely-extending integral boss intermediate the ends of the member, the boss being provided with exterior and interior threads and with a bore communicating with the through-bore, and the generally-tubular body member being externally threaded at opposite ends and adapted to have one of the threaded ends threaded into a pipe;
    a cap having interior threads engaging the exterior threads of the boss, the cap having an aperture therethrough coaxially aligned with the bore of the boss;
    a washer between the boss and the cap and having an aperture coaxial with the aperture of the cap, the inner side of the washer having a projecting peripheral skirt, the end of the skirt engaging the rim of the boss and constituting an extension of the latter;
    a valve plug having exterior threads engaging the interior threads of the boss and a non-circular rotating-tool-engageable means on the outer end of the plug accessible through the aperture in the cap; and
    a resilient stopper secured to the inner end of the plug and movable by rotation of the latter from a valve-closed position blocking the through-bore to a valve-open position substantially within the boss bore, the combined axial lengths of the plug and resilient stopper being greater than the axial length of the boss bore.

3. The valve structure defined in claim 2 in which the non-circular rotating-tool-engageable means is a socket in the plug.

4. The valve structure defined in claim 2 in which the plug has a key projecting inwardly therefrom and the resilient stopper is molded onto the key.

5. The valve structure defined in claim 2 in which the combined axial lengths of the plug and resilient stopper are substantially equal to the combined axial lengths of the boss bore and the skirt.

6. The valve structure defined in claim 2 in which the axial length of the stopper is slightly greater than the diameter of the through-bore at the intersection of the latter by the boss bore.

7. The valve structure defined in claim 2 including interengaging means on the cap and the washer for preventing relative rotation therebetween.

8. The valve structure defined in claim 7 in which the interengaging means comprises an inner portion in the cap, inwardly of the threads therein, of non-circular configuration and a complementary outer periphery on the washer.

9. The valve structure defined in claim 2 including interengaging means on the cap and the washer for releasably securing them together as a unitary assembly.

10. The valve structure defined in claim 9 in which the interengaging means includes an outwardly-extending sleeve portion of the washer snugly engageable within the aperture in the cap, the outer end of the sleeve portion having an exterior bead overlying the outerside of the cap.

11. The valve structure defined in claim 2 in which the diameter of the resilient stopper is slightly greater than the diameter of the crest of the threads in the boss for forming an interference fit with the threads in the boss.

12. The valve structure defined in claim 2 in which the rim of the boss is exteriorly bevelled for reducing the turning radius of the valve structure.

13. A valve assembly for use in tapping and installation machines comprising:
    a generally-tubular body member having a through-bore and a transversely-extending integral boss intermediate the ends of the member, the boss being provided with exterior and interior threads and with a bore communicating with the through-bore, and the generally-tubular body member being externally threaded at opposite ends and adapted to have one of the threaded ends threaded into a pipe;
    a cap having interior threads adapted to engage the exterior threads of the boss, the cap having central aperture therethrough;
    a washer adapted to be inserted between the boss and the cap and having a central aperture, the inner side of the washer having an axially projecting peripheral skirt, the end of the skirt being adapted to engage the rim of the boss and to constitute an extension of the latter when so engaged;
    a valve plug having exterior threads adapted to engage the interior threads of the boss and a non-circular rotating-tool-engageable means on the outer end thereof; and
    a resilient stopper adapted to be secured to the inner end of the plug, the combined axial lengths of the plug and resilient stopper being greater than the axial length of the boss bore.

References Cited

UNITED STATES PATENTS

| | | | |
|---|---|---|---|
| 1,010,837 | 12/1911 | Woodworth | 251—220 |
| 2,913,012 | 11/1959 | McCurley | 138—94 |
| 2,925,246 | 2/1960 | Sardeson | 251—191 |
| 2,964,290 | 12/1960 | Mueller | 137—318 X |
| 3,036,601 | 5/1962 | Fabian et al. | 138—89 |
| 3,157,203 | 11/1964 | Van Nooy | 138—89 |
| 3,217,735 | 11/1965 | Stalter | 137—315 X |

WILLIAM F. O'DEA, *Primary Examiner.*

D. R. MATTHEWS, *Assistant Examiner.*